(12) United States Patent
Kim (10) Patent No.: US 10,732,667 B2
(45) Date of Patent: Aug. 4, 2020

(54) PEDAL APPARATUS FOR VEHICLE

(71) Applicants: HYUNDAI MOTOR COMPANY, Seoul (KR); KIA MOTORS CORPORATION, Seoul (KR)

(72) Inventor: Eun Sik Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/380,451

(22) Filed: Apr. 10, 2019

(65) Prior Publication Data

US 2020/0183443 A1  Jun. 11, 2020

(30) Foreign Application Priority Data

Dec. 10, 2018  (KR) .................. 10-2018-0158667

(51) Int. Cl.
| G05G 1/30 | (2008.04) |
|---|---|
| G05G 1/44 | (2008.04) |
| B60K 26/02 | (2006.01) |
| B60K 26/04 | (2006.01) |
| G05G 1/38 | (2008.04) |
| B60T 7/06 | (2006.01) |
| B60T 7/04 | (2006.01) |
| G05G 5/05 | (2006.01) |
| B60K 7/00 | (2006.01) |

(52) U.S. Cl.
CPC ............ *G05G 1/305* (2013.01); *B60K 26/02* (2013.01); *B60K 26/04* (2013.01); *B60T 7/042* (2013.01); *B60T 7/06* (2013.01); *G05G 1/30* (2013.01); *G05G 1/38* (2013.01); *G05G 1/44* (2013.01); *G05G 5/05* (2013.01); *B60K 7/0007* (2013.01); *B60K 2026/046* (2013.01); *G05G 2505/00* (2013.01)

(58) Field of Classification Search
CPC . G05G 1/44; G05G 1/30; B60K 26/02; B60T 7/04; B60T 7/06
See application file for complete search history.

(56) References Cited

U.S. PATENT DOCUMENTS

| 4,060,144 A | 11/1977 | Teti | |
|---|---|---|---|
| 5,599,255 A * | 2/1997 | Ki-Dong | G05G 1/305 477/211 |
| 6,962,094 B2 * | 11/2005 | Porter | G05G 1/405 74/512 |
| 8,726,759 B2 * | 5/2014 | Mannle | G05G 1/38 74/512 |

(Continued)

FOREIGN PATENT DOCUMENTS

| CN | 200995626 Y | 12/2017 |
|---|---|---|
| JP | 2006-130986 A | 5/2006 |

(Continued)

*Primary Examiner* — Luis A Gonzalez
(74) *Attorney, Agent, or Firm* — Morgan, Lewis & Bockius LLP (57) ABSTRACT

A pedal apparatus for a vehicle may include a pedal housing fixedly disposed in a space in which a driver's foot is located; and an accelerator pedal and a brake pedal pivotably connected to the pedal housing, wherein, when the accelerator pedal is operated, the accelerator pedal pivots independently of the brake pedal, and when the brake pedal is operated, both the brake pedal and the accelerator pedal pivot.

15 Claims, 12 Drawing Sheets

(56) References Cited

U.S. PATENT DOCUMENTS

| | | | |
|---|---|---|---|
| 9,110,494 B2 * | 8/2015 | Kim | G05G 1/44 |
| 2008/0276749 A1 | 11/2008 | Stewart et al. | |
| 2008/0314192 A1 * | 12/2008 | Willemsen | G05G 1/38 74/512 |
| 2016/0070293 A1 | 3/2016 | Zhou et al. | |

FOREIGN PATENT DOCUMENTS

| | | | |
|---|---|---|---|
| JP | 2014006853 A | * | 1/2014 |
| JP | 2017165294 A | * | 9/2017 |
| KR | 10-1997-0003553 B1 | | 3/1997 |
| KR | 10-1554358 B1 | | 9/2015 |
| KR | 10-2017-0123944 A | | 11/2017 |

\* cited by examiner

PEDAL APPARATUS FOR VEHICLE

CROSS REFERENCE TO RELATED APPLICATION

The present application claims priority to Korean Patent Application No. 10-2018-0158667, filed Dec. 10, 2018, the entire contents of which is incorporated herein for all purposes by this reference.

BACKGROUND OF THE INVENTION

Field of the Invention

The present invention generally relates to a pedal apparatus for a vehicle and, more particularly, to a pedal apparatus for a vehicle, in which a brake pedal and an accelerator pedal are provided in a single pedal housing so as to operate in the same direction.

Description of Related Art

In typical vehicles, an accelerator pedal for accelerating a vehicle and a brake pedal for braking the vehicle are disposed in a space below a driver's seat such that the accelerator pedal and the brake pedal are respectively operated by a driver's foot.

The space below the driver's seat is limited, due to the accelerator pedal and the brake pedal being disposed therein, increasing the fatigue of the driver. The injury of the driver may be increased by the two pedals, which is problematic.

Recently, solutions in which an accelerator pedal and a brake pedal are integrated as a single assembly have been developed. In such cases, however, the accelerator pedal and the brake pedal are operated in different directions, so that a different sensation in the operation of the pedals may be caused. The different sensation may cause an erroneous operation to be performed by the driver, which is problematic.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pedal apparatus configured for a vehicle, in which a brake pedal and an accelerator pedal are provided in a single pedal housing to operate in the same direction thereof. A relatively-larger space may be provided below the driver's seat, reducing the fatigue of the driver. The pedal apparatus can minimize a phenomenon in which the injury of a driver may be increased by the pedals in the event of an accident.

Also provided is a pedal apparatus configured for a vehicle, in which both the accelerator pedal and the brake pedal provided in the single pedal housing are configured to operate in the same direction toward the front, so that a different sensation in the operation of the pedals may be removed. The operation of the accelerator pedal the operation of the brake pedal may be clearly distinguished, advantageously preventing an erroneous operation from being performed by the driver.

Also provided is a pedal apparatus configured for a vehicle, the pedal apparatus being able to be used vehicles provided with an electronic brake system or vehicles provided with an in-wheel propulsion system.

In various aspects of the present invention, a pedal apparatus configured for a vehicle may include: a pedal housing fixedly disposed in a space in which a driver's foot is located; and an accelerator pedal and a brake pedal pivotably connected to the pedal housing. When the accelerator pedal is operated, the accelerator pedal may pivot independently of the brake pedal. When the brake pedal is operated, both the brake pedal and the accelerator pedal may pivot.

The accelerator pedal and the brake pedal overlap are configured such that a portion of the accelerator pedal and a portion of the brake pedal overlap each other, with a bottom surface portion of the brake pedal adjoining a top surface portion of the accelerator pedal.

The pedal apparatus may further include a pedal hinge detachably connected to the pedal housing. The pedal hinge may include: a first hinge protrusion to which the accelerator pedal is coupled; and a second hinge protrusion to which the brake pedal is coupled. The first hinge protrusion and the second hinge protrusion may be separated from each other to be pivotable independently of each other.

The accelerator pedal may include: a first hinge coupling portion coupled to the first hinge protrusion; an overlapping portion vertically extending from the first hinge coupling portion to overlap the brake pedal; and a first control portion laterally extending from a distal portion of the overlapping portion to protrude beyond an edge portion of the brake pedal. The first control portion may be operated by a front portion of the driver's foot that adjoins the first control portion.

The brake pedal may include: a second hinge coupling portion coupled to the second hinge protrusion; a second control portion vertically extending from the second hinge coupling portion to overlap the overlapping portion of the accelerator pedal; and a side cover bent from an edge portion of the second control portion toward the pedal housing. The second control portion may be operated by an entire portion of the driver's foot that adjoins the second control portion.

The pedal apparatus may further include: a pedal arm disposed in the pedal housing to be pivotable about a hinge shaft; a first spring having both end portions supported on the pedal housing and the pedal arm; a push rod connecting the pedal arm and the accelerator pedal; and an accelerator position sensor (APS) coupled to the pedal housing to detect a pivot angle of the pedal arm and transfer a signal to a controller.

The pedal apparatus may further include a second spring having both end portions supported on the pedal housing and the brake pedal to provide an elastic force by which the brake pedal resumes an original position of the brake pedal.

The pedal apparatus may further include: a guide groove provided in one side surface of the pedal housing to extend along a radius of rotation of the brake pedal; a flange protruding from the brake pedal toward the guide groove; and a stopper pin having one end portion coupled to the flange and the other end portion inserted into the guide groove, the stopper pin being configured to move along the guide groove to guide pivoting of the brake pedal while preventing the brake pedal from being separated from the pedal housing when the brake pedal is operated.

The pedal apparatus may further include: a permanent magnet coupled to a side cover of the brake pedal; and a printed circuit board (PCB) coupled to the pedal housing, the PCB being configured to detect a pivot angle of the brake pedal on the basis of displacements of the permanent magnets and transfer a signal to the controller when the brake pedal is manipulated.

When only the accelerator pedal is operated, only an acceleration signal may be generated by the APS. When the brake pedal is operated, both an acceleration signal by the APS and a braking signal by the PCB may be generated.

When only the acceleration signal is generated by the APS, the controller may perform a control process to accelerate a vehicle. When both the acceleration signal by the APS and the braking signal by the PCB are generated, the controller may perform a control process to brake the vehicle by accepting the braking signal with higher priority. When only the braking signal is generated by the PCB, the controller may perform a failure mode control process.

In a case of a vehicle provided with an electronic brake system, when only the acceleration signal is generated by the APS in a response to the accelerator pedal being operated, the controller may be configured to control an engine to accelerate the vehicle. When both the acceleration signal by the APS and the braking signal by the PCB are generated in a response to the brake pedal being operated, the controller may perform a control process to brake the vehicle by controlling operations of a front wheel power transmission caliper and a rear wheel power transmission caliper.

In a case of a vehicle provided with an in-wheel propulsion system, when only the acceleration signal is generated by the APS in a response to the accelerator pedal being operated or both the acceleration signal by the APS and the braking signal by the PCB are generated in a response to the brake pedal being operated, the controller may perform a control process to accelerate or brake the vehicle by controlling operations of a front in-wheel motor and a rear in-wheel motor.

As set forth above, the pedal apparatus configured for a vehicle according to an exemplary embodiment of in various aspects of the present invention, both the accelerator pedal and the brake pedal are provided in the single pedal housing, so that the number of components and fabrication costs may be reduced. Since only the single pedal housing is disposed, a relatively-larger space may be provided below the driver's seat. The reduced number of components can advantageously minimize a phenomenon in which the injury of a driver is increased by the pedals.

Furthermore, both the accelerator pedal and the brake pedal provided in the single pedal housing are configured to pivot back and forth when operated by the driver. Since the accelerator pedal and the brake pedal operate in the same directions as an accelerator pedal and a brake pedal of the related art, a different sensation in the operation of the pedals compared to the operation of the pedals of the related art may be removed, maintaining the convenience of the operation. The possibility of an erroneous operation may be advantageously removed.

Furthermore, according to an exemplary embodiment of the present invention, the accelerator pedal is operated by the front portion of the foot, in a manner similar to the manner in which a pendant type pedal apparatus of the related art is operated, while the brake pedal is operated by the entire portions of the foot, in a manner similar to the manner in which a pedal device in the shape of an organ pedal is operated. Accordingly, the pedal apparatus according to an exemplary embodiment of in various aspects of the present invention, the operation of the accelerator pedal and the operation of the brake pedal may be clearly distinguished from each other, advantageously preventing an erroneous operation from being performed by the driver.

Furthermore, the pedal apparatus according to an exemplary embodiment of the present invention may be implemented as an electronic pedal device, which may be advantageously used in vehicles provided with an electronic brake system or vehicles provided with an in-wheel propulsion system.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a pedal apparatus configured for a vehicle according to exemplary embodiments of the present invention will be described in detail with reference to the accompanying drawings. Throughout the drawings, the same reference numerals will refer to the same or like parts.

As illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, the pedal apparatus configured for a vehicle according to an exemplary embodiment of the present invention includes a single pedal housing 10 fixedly disposed in a space, in which driver's feet are located, and an accelerator pedal 20 and a brake pedal 30 pivotably connected to the pedal housing 10.

That is, various exemplary embodiments of the present invention are configured such that both the accelerator pedal 20 and the brake pedal 30 are mounted on the single pedal housing 10. The present configuration can reduce the number of components and fabrication costs. Since only the single pedal housing 10 is provided, a relatively-larger space may be provided below the driver's feet. The reduced number of components can advantageously prevent a phenomenon in which the pedal may increase the injury of the driver in an accident.

The accelerator pedal 20 and the brake pedal 30 according to exemplary embodiments of the present invention are configured such that the accelerator pedal 20 pivots independently of the brake pedal 30 when the accelerator pedal 20 is operated while the brake pedal 30 pivots together with the accelerator pedal 20 when the brake pedal 30 is operated.

To provide a structure allowing both the brake pedal 30 and the accelerator pedal 20 to pivot together when the brake pedal 30 is operated, a portion of the accelerator pedal 20 and a portion of the brake pedal 30 are disposed to overlap each other, with the bottom surface of a portion of the brake pedal 30 adjoining the top surface of a portion of the accelerator pedal 20.

Both the accelerator pedal 20 and the brake pedal 30 according to an exemplary embodiment of the present invention are operated by the driver's foot, and are configured to pivot back and forth when operated. Since both the accelerator pedal 20 and the brake pedal 30 pivot back and forth in the same direction as an accelerator pedal and a brake pedal of the related art, a different sensation in the operation of the pedals compared to the operation of the pedals of the related art may be removed, maintaining the convenience of the operation. The possibility of an erroneous operation may be advantageously removed.

The pedal apparatus according to an exemplary embodiment of the present invention further includes a pedal hinge 40 detachably connected to the pedal housing 10.

The pedal hinge 40 includes a bar-shaped hinge body 41, a first hinge protrusion 42, and a second hinge protrusion 43 the first hinge protrusion 42 and the second hinge protrusion 43 being pivotably connected to the hinge body 41. The pedal housing 10 has a hinge groove 11 extending in a lateral direction thereof, such that the hinge body 41 is inserted into the hinge groove 11, such that the pedal hinge 40 is detachably connected to the pedal housing 10. The first hinge protrusion 42 and the second hinge protrusion 43 are disposed in the lateral direction and separated from each other to be pivotable independently of each other.

The accelerator pedal 20 is coupled to the first hinge protrusion 42, while the brake pedal 30 is coupled to the second hinge protrusion 43.

The accelerator pedal 20 includes a first hinge coupling portion 21 coupled to the first hinge protrusion 42, an overlapping portion 22 vertically extending from the first hinge coupling portion 21 to overlap the brake pedal 30, a first control portion 23 laterally extending from a distal portion of the overlapping portion 22 to protrude beyond an edge portion of the brake pedal 30, and a connecting portion 24 laterally protruding from an intermediate portion of the overlapping portion 22.

Figure 9A:
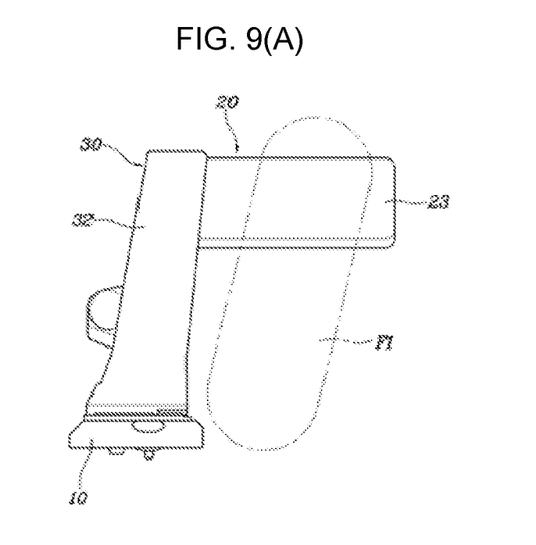
FIG. 9A and FIG. 9B are front and side views illustrating an operation of the accelerator pedal according to an exemplary embodiment of the present invention, which is operated by a driver's foot.
Figure 9B:
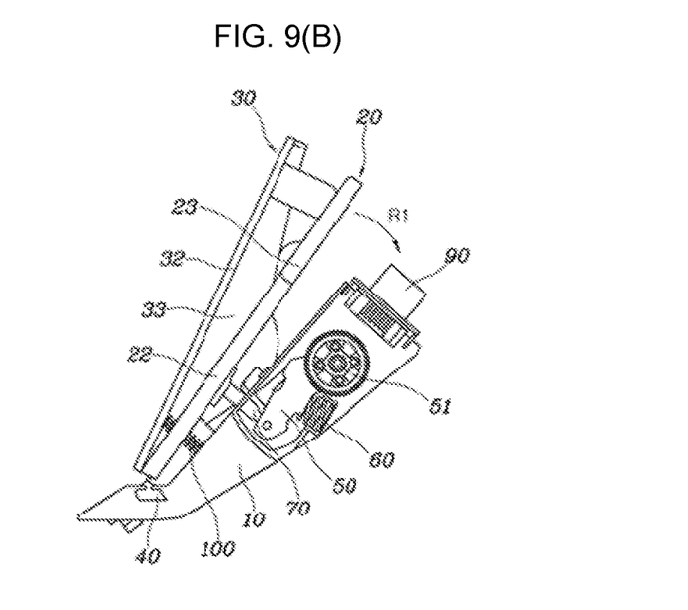

As illustrated in FIG. 9A and FIG. 9B, the laterally-extending, first control portion 23 of the accelerator pedal 20 is operated by the driver's foot, during which the front portion of the driver's foot adjoins the first control portion 23. Accordingly, the accelerator pedal 20 according to an exemplary embodiment of the present invention is operated in a manner similar to the manner in which a pendant type pedal apparatus of the related art is operated.

The brake pedal 30 includes a second hinge coupling portion 31 coupled to the second hinge protrusion 43, a second control portion 32 vertically extending from the second hinge coupling portion 31 to overlap the overlapping portion 22 of the accelerator pedal 20, and a side cover 33 bent from an edge portion of the second control portion 32 toward the pedal housing 10.

Figure 10A:
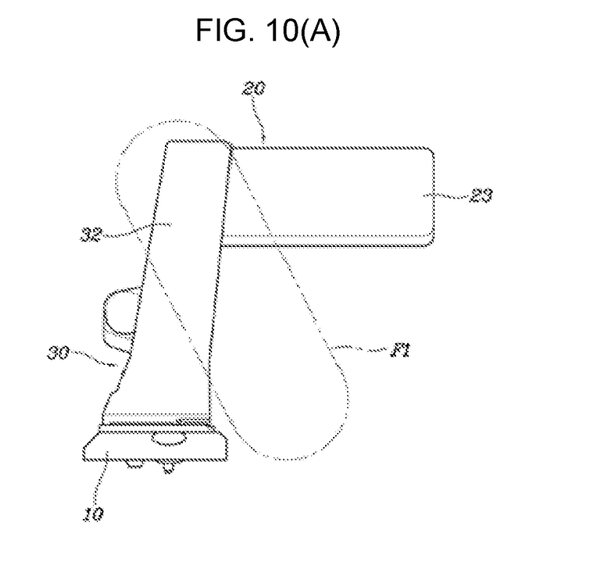
FIG. 10A and FIG. 10B are front and side views illustrating an operation of the brake pedal according to an exemplary embodiment of the present invention, which is operated by a driver's foot.
Figure 10B:
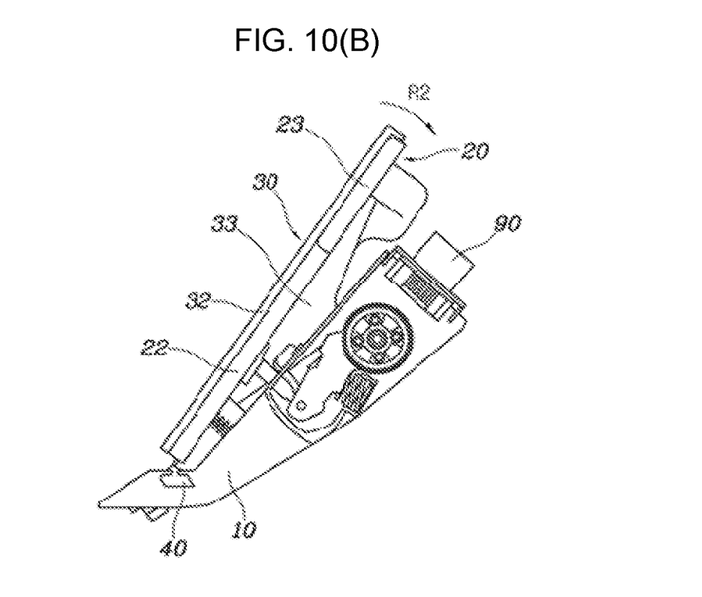

As illustrated in FIG. 10A and FIG. 10B, when the driver's foot F1 operates the vertically-extending, second control portion 32, the entire portions of the driver's foot (i.e., the front portion, the middle portion, and a portion of the rear portion of the foot) adjoin the second control portion 32. Accordingly, the brake pedal 30 according to an exemplary embodiment of the present invention is operated in a manner similar to the manner in which a pedal device in the shape of an organ pedal of the related art is operated.

Since the accelerator pedal 20 is operated by the front portion of the foot, in a manner similar to the manner in which a pendant type pedal apparatus of the related art is operated, while the brake pedal 30 is operated by the entire portions of the foot, in a manner similar to the manner in which a pedal device in the shape of an organ pedal of the related art is operated. Accordingly, the type pedal apparatus according to an exemplary embodiment of in various aspects of the present invention, the operation of the accelerator pedal 20 and the operation of the brake pedal 30 may be clearly distinguished, advantageously preventing an erroneous operation from being performed by the driver.

The pedal apparatus according to an exemplary embodiment of the present invention may further include a pedal arm 50 disposed in the pedal housing 10 to be pivotable about a hinge shaft 51; a first spring 60 having both end portions supported on the pedal housing 10 and the pedal arm 50, respectively; a push rod 70 connecting the pedal arm 50 and the accelerator pedal 20; and accelerator position sensor (APS) 90 coupled to the pedal housing 10 to detect a pivot angle of the pedal arm 50 and transfer a signal (regarding the pivot angle) to a controller 80.

The pedal arm 50 is disposed in the internal space of the pedal housing 10 and coupled to the pedal housing 10 to be pivotable about the hinge shaft 51. The first spring 60 provides elasticity to the pedal arm 50 so that the pedal arm 50 can pivot clockwise about the hinge shaft 51, with respect to the position illustrated in FIG. 4. Both end portions of the push rod 70 are hinged to the connecting portion 24 of the accelerator pedal 20 and one end portion of the pedal arm 50 such that the push rod 70 is pivotable relative to the accelerator pedal 20 and the pedal arm 50.

A single or two first springs 60 may be provided. When two first springs 60 are provided, an internal spring may be internally disposed within an external spring. In the instant case, a pad member may be situated between the external spring and the internal spring to prevent interference.

Descriptions of the above-described components, such as the pedal arm 50, the first spring 60, and the push rod 70, will be omitted, since they are technological elements that are widely used in a pedal device in the shape of an organ pedal.

The pedal apparatus according to an exemplary embodiment of the present invention further includes a second spring 100 having both end portions supported on the pedal housing 10 and the brake pedal 30 to provide an elastic force by which the brake pedal 30 resumes the original position.

The second spring 100 is a compressed coil spring disposed in a position in which no interference occurs when either the accelerator pedal 20 or the push rod 70 operates. The second spring 100 provides elastic force to the brake pedal 30 so that the brake pedal 30 can pivot counterclockwise about the hinge body 41, with respect to the position illustrated in FIG. 4.

The pedal apparatus according to an exemplary embodiment of the present invention further includes a guide groove 110 provided in one side surface of the pedal housing 10 to extend along a radius of rotation of the brake pedal 30, a flange 120 protruding from the brake pedal 30 toward the guide groove 110, and a stopper pin 130 having one end portion coupled to the flange 120 and the other end portion inserted into the guide groove 110. When the brake pedal 30 is operated, the stopper pin 130 moves along the guide groove 110 to guide pivoting of the brake pedal 30 while preventing the brake pedal 30 from being separated from the pedal housing 10.

Figure 1:
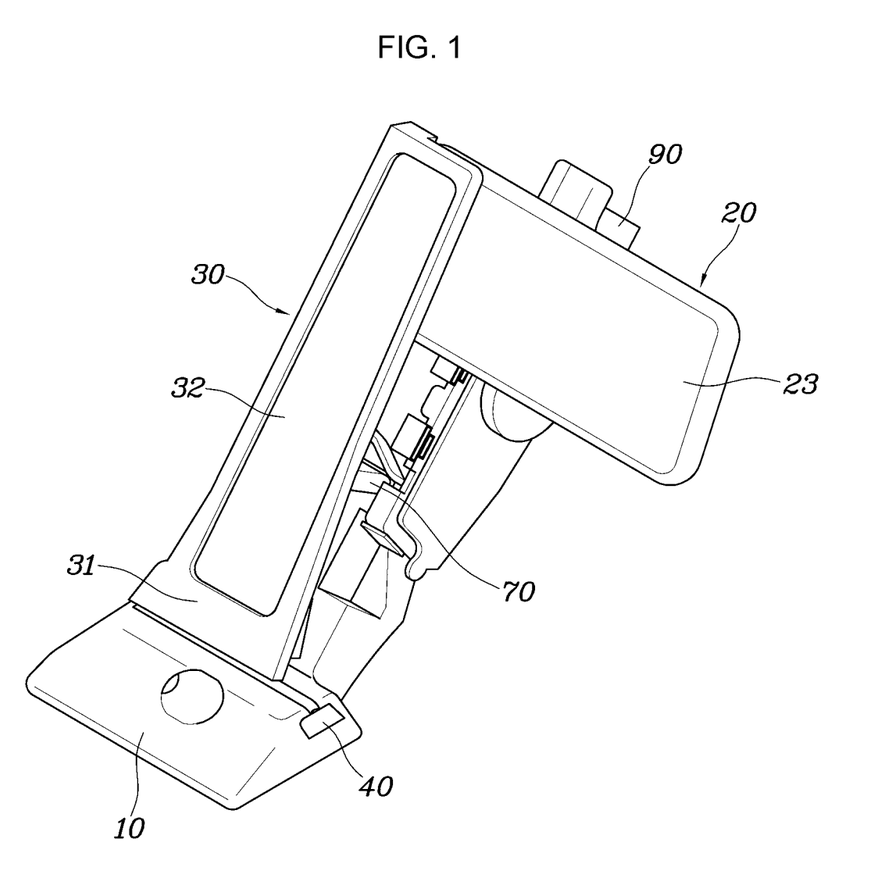
FIG. 1 and FIG. 2 are assembled perspective views illustrating a pedal apparatus configured for a vehicle according to an exemplary embodiment of the present invention.
Figure 2:
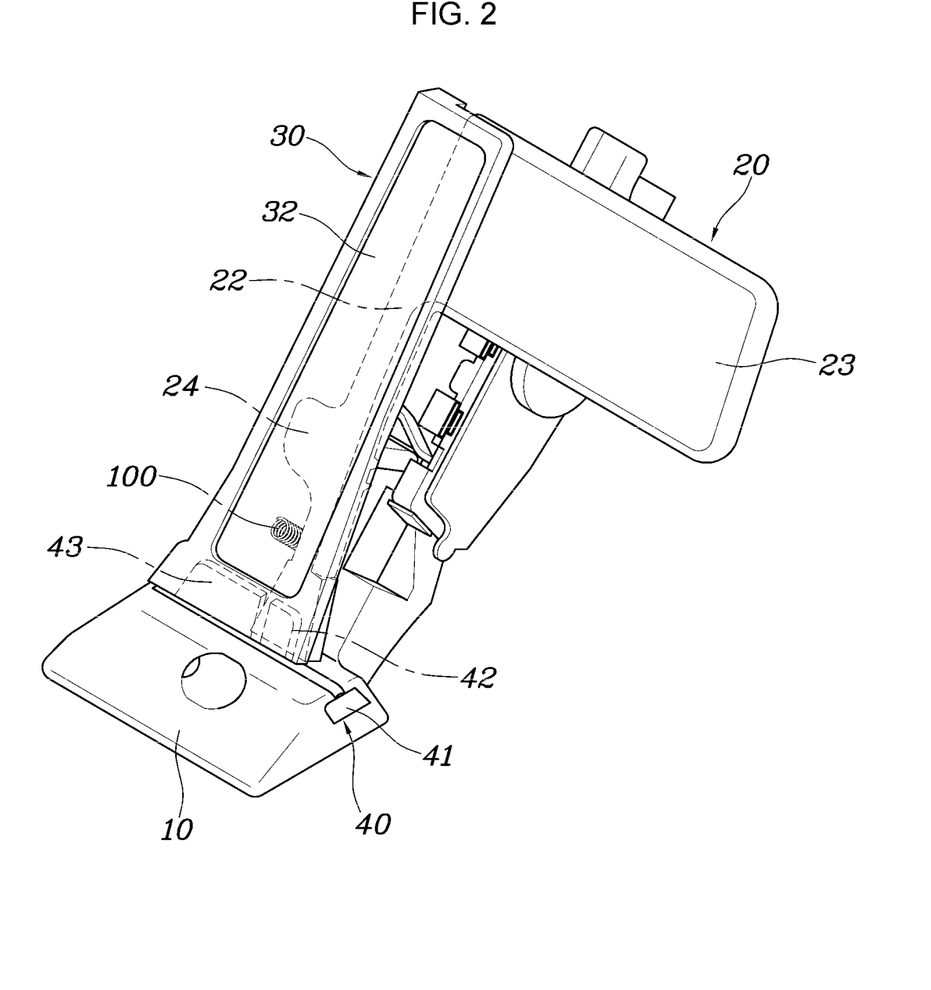
Figure 3:
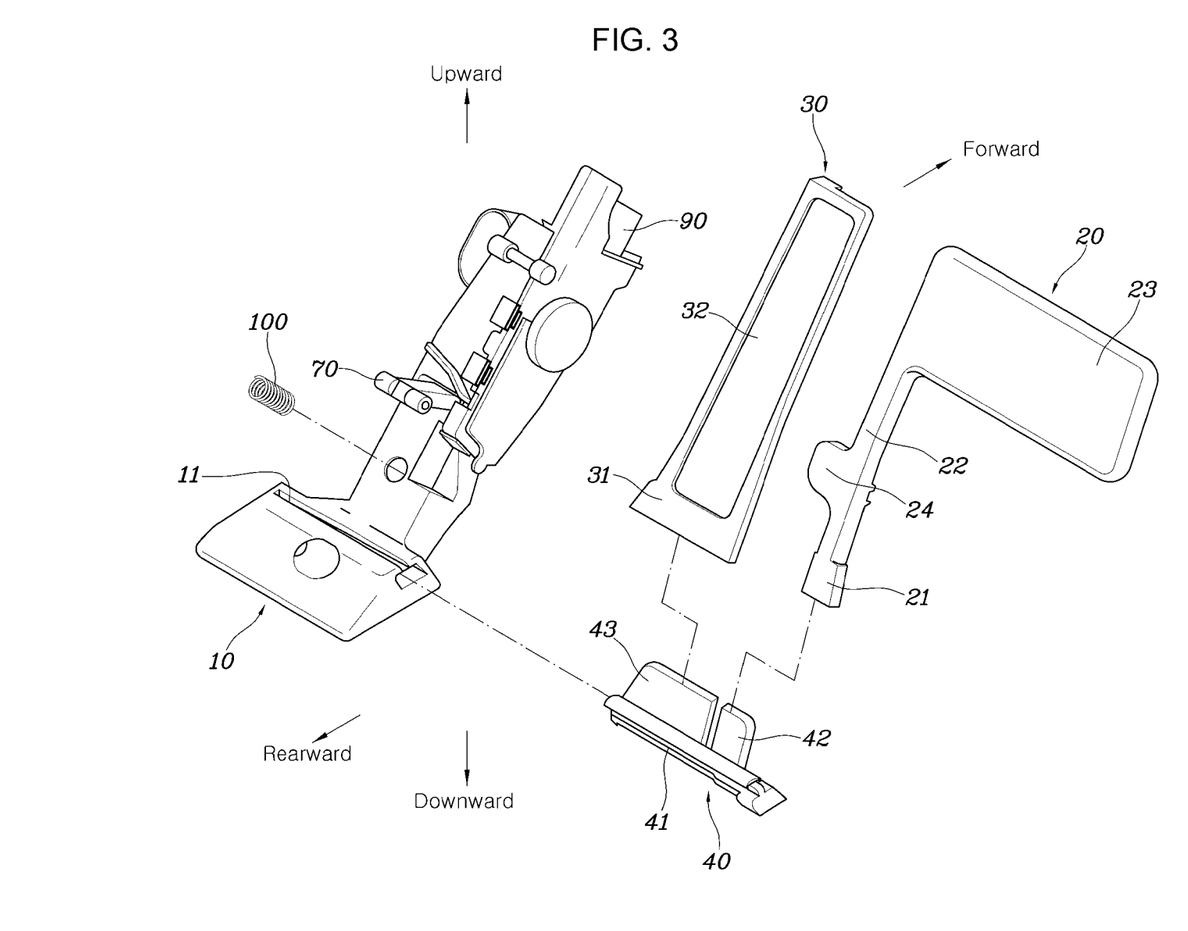
FIG. 3 is an exploded perspective view exemplarily illustrating the pedal apparatus configured for a vehicle according to an exemplary embodiment of the present invention.
Figure 4:
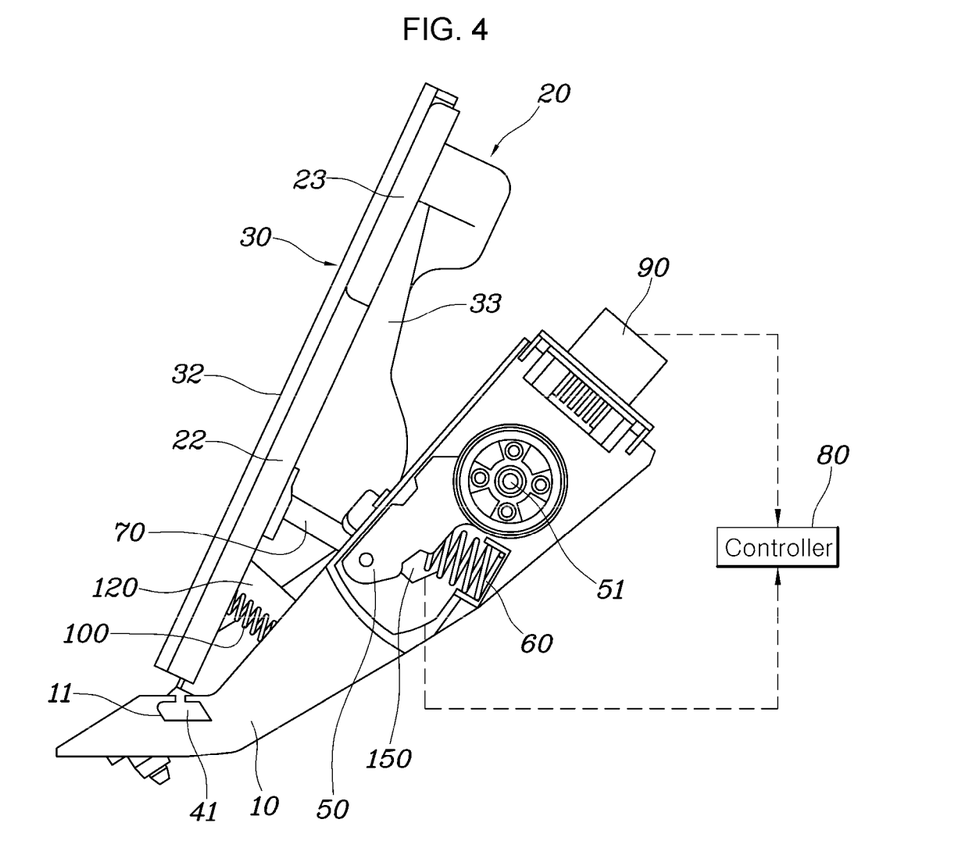
FIG. 4 is a side view exemplarily illustrating internal components of the pedal housing.
Figure 5:
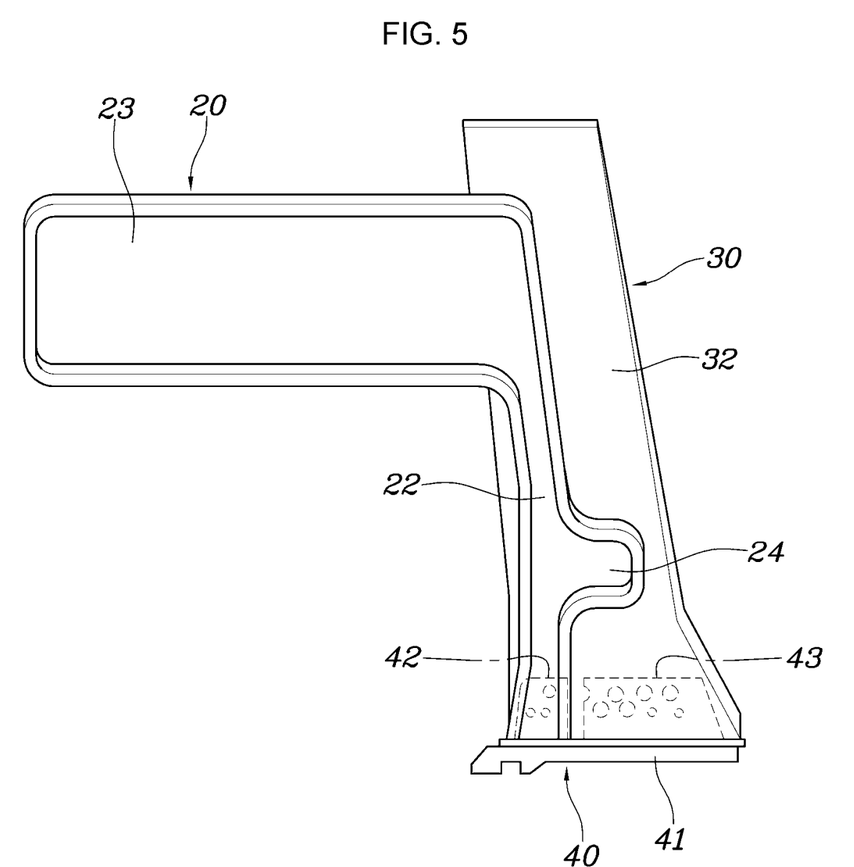
FIG. 5 is a rear view exemplarily illustrating rear portions of the accelerator pedal and the brake pedal.
Figure 6:
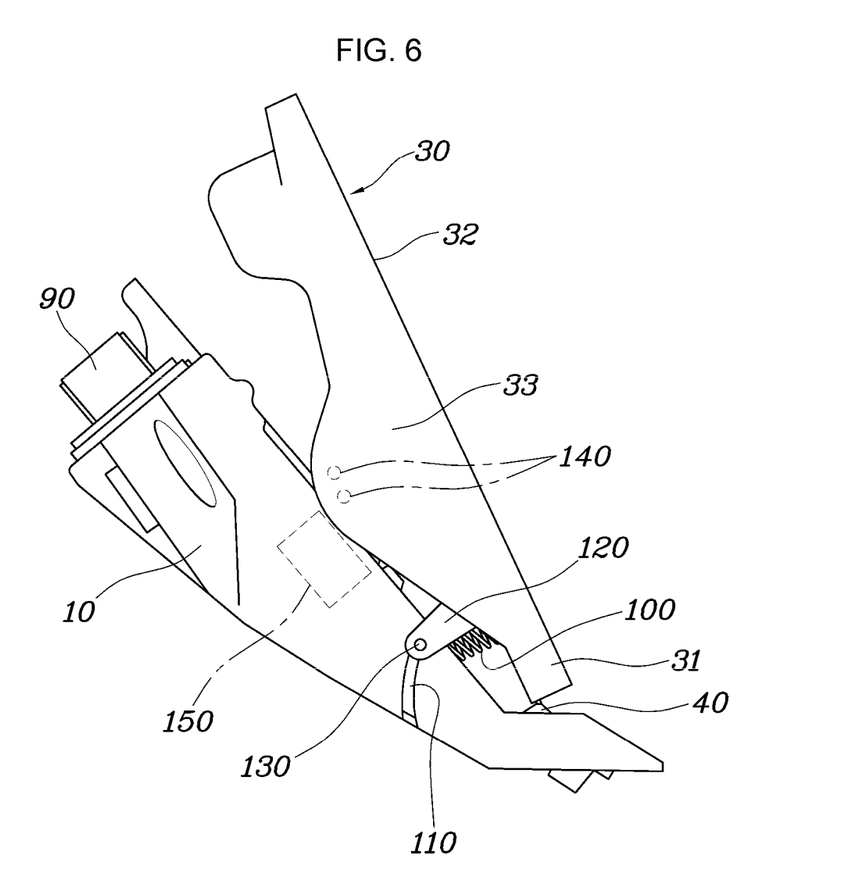
FIG. 6 is an assembled side view exemplarily illustrating the pedal housing and the brake pedal.
Figure 7:
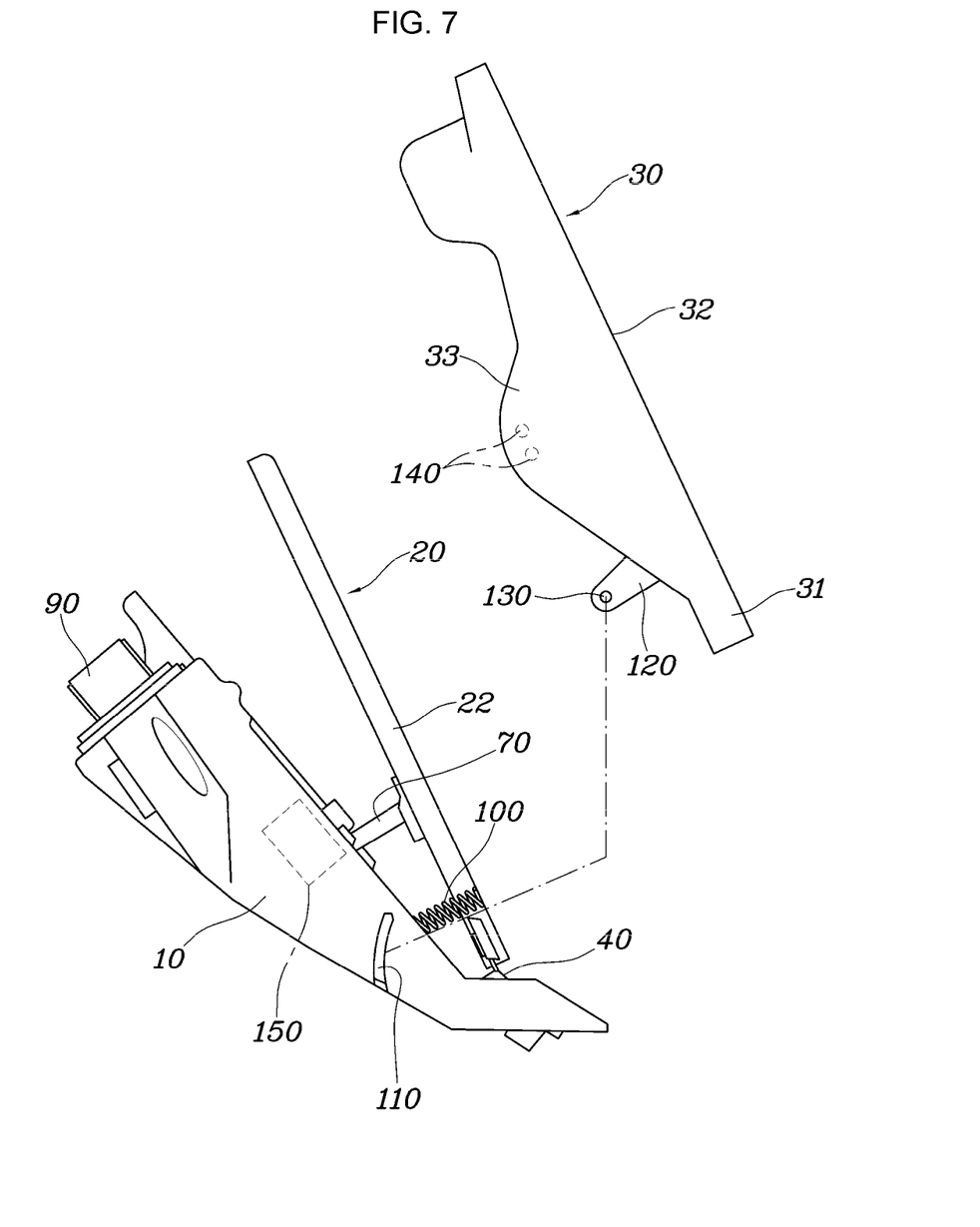
FIG. 7 is a disassembled view of FIG. 6, illustrating the pedal housing and the brake pedal.
Figure 8:
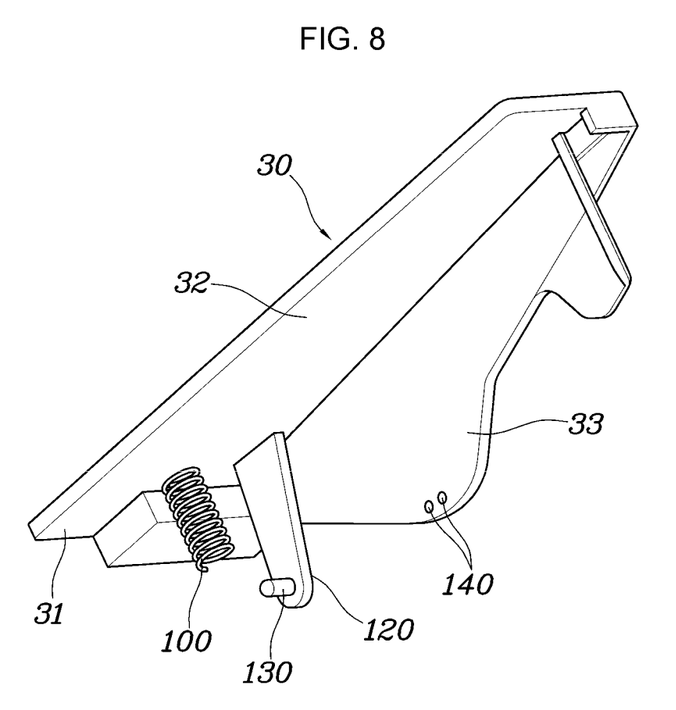
FIG. 8 is a perspective view exemplarily illustrating the brake pedal.

The brake pedal 30 is provided with clockwise torque by the elasticity of the second spring 100, with respect to the position illustrated in FIG. 6. As the stopper pin 130 remains caught in the top end portion of the guide groove 110, the brake pedal 30 is prevented from being separated from the pedal housing 10 by the stopper pin 130 inserted into the guide groove 110.

The pedal apparatus according to an exemplary embodiment of the present invention further includes permanent magnets 140 coupled to the side cover 33 of the brake pedal 30 and a printed circuit board (PCB) 150 coupled to the pedal housing 10. When the brake pedal 30 is manipulated, the PCB 150 is configured to detect a pivot angle of the brake pedal 30, on the basis of displacements of the permanent magnets 140, and transfer a signal (regarding the pivot angle) to the controller 80.

Although the permanent magnets 140 may be provided as one or more magnets for the accuracy of operations and the concept of fail-safe, the present invention is not limited thereto.

As described above, embodiments of the present invention are configured such that the accelerator pedal 20 can pivot independently of the brake pedal 30. When only the accelerator pedal 20 is operated to pivot in a response to the operation by the driver, only an acceleration signal is generated by the APS 90. When only the acceleration signal is generated by the APS 90, the controller 80 performs a control process to accelerate the vehicle.

Furthermore, as described above, when the driver operates the brake pedal 30, the accelerator pedal 20 pivots along with the brake pedal 30. Thus, when the driver operates the brake pedal 30, an acceleration signal is generated by the APS 90 while a braking signal is altogether generated by the PCB 150.

When both the acceleration signal by the APG 90 and the braking signal by the PCB 150 are altogether generated, the controller 80 performs a control process to brake the vehicle by accepting the braking signal by the PCB 150 with higher priority.

Furthermore, when the accelerator pedal 20 is operated, only the acceleration signal is generated by the APS 90. When the brake pedal 30 is operated, both the acceleration signal by the APS 90 and the braking signal by the PCB 150 are generated. In embodiments of the present invention, there is no case in which only the braking signal by the PCB 150 is generated. When only the braking signal is generated by the PCB 150, the controller 80 performs a failure mode control process. A warning may be provided to the driver due to the failure mode control process.

The pedal apparatus according to an exemplary embodiment of the present invention may be implemented as an electronic pedal device, which may be advantageously used in vehicles provided with an electronic brake system or vehicles provided with an in-wheel propulsion system.

Figure 11:
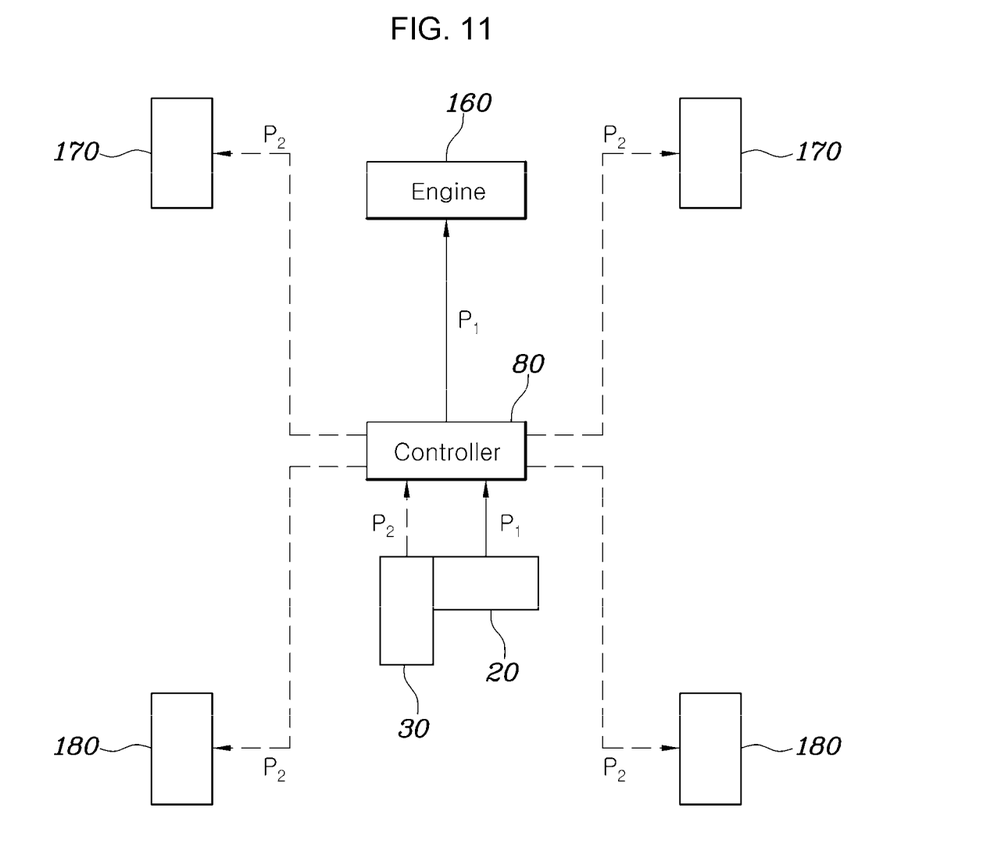
FIG. 11 and FIG. 12 are block diagrams illustrating applications of the pedal apparatus according to an exemplary embodiment of the present invention, used in a vehicle provided with an electronic brake system and a vehicle provided with an in-wheel propulsion system.

As illustrated in FIG. 11, the pedal apparatus may be used in a vehicle provided with an electronic brake system. When only an acceleration signal is generated by the APS 90 in a response to the accelerator pedal 20 being operated, the controller 80 controls an engine 160 to accelerate the vehicle (path P1). When both an acceleration signal by the APS 90 and a braking signal by the PCB 150 are generated in a response to the brake pedal 30 being operated, the controller 80 performs a control process to brake the vehicle by controlling the operation of front wheel power transmission calipers 170 and the operation of rear wheel power transmission calipers 180 (paths P2).

Figure 12:
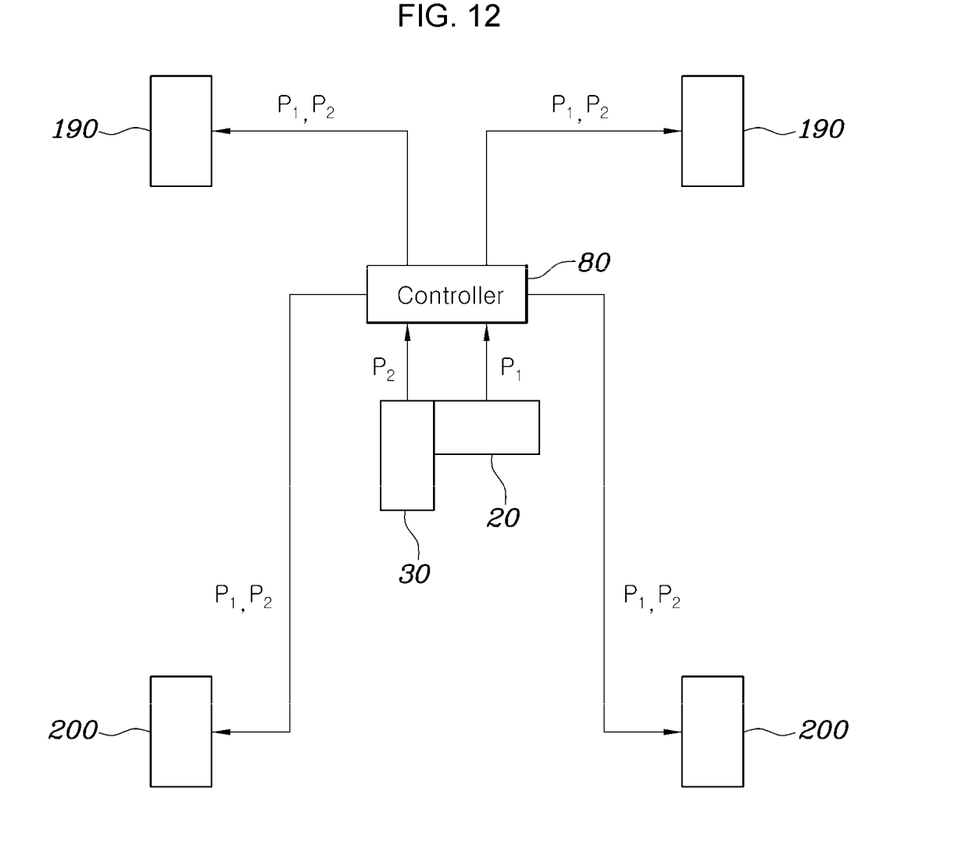

Furthermore, as illustrated in FIG. 12, the pedal apparatus may be used in a vehicle provided with an in-wheel propulsion system. When only an acceleration signal is generated by the APS 90 in a response to the accelerator pedal 20 being operated, the controller 80 performs a control process to accelerate the vehicle by controlling the operation of front in-wheel motors 190 and the operation of rear in-wheel motors 200 (paths P1). When both an acceleration signal by the APS 90 and a braking signal by the PCB 150 are generated in a response to the brake pedal 30 being operated, the controller 80 performs a control process to brake the vehicle by controlling the operation of front in-wheel motors 190 and the operation of rear in-wheel motors 200 (paths P2).

As set forth above, the pedal apparatus configured for a vehicle according to an exemplary embodiment of in various aspects of the present invention, both the accelerator pedal 20 and the brake pedal 30 are provided in the single pedal housing 10. The present configuration can reduce the number of components and fabrication costs. Since only the single pedal housing 10 is disposed, a relatively-larger space may be provided below the driver's seat. The reduced number of components can advantageously minimize a phenomenon in which the injury of a driver is increased by the pedals.

Furthermore, both the accelerator pedal 20 and the brake pedal 30 provided in the single pedal housing 10 are configured to pivot back and forth when operated by the driver. Since the accelerator pedal 20 and the brake pedal 30 operate in the same directions as an accelerator pedal and a brake pedal of the related art, a different sensation in the operation of the pedals compared to the operation of the pedals of the related art may be removed, maintaining the convenience of the operation. The possibility of an erroneous operation may be advantageously removed.

Furthermore, according to an exemplary embodiment of the present invention, the accelerator pedal 20 is operated by the front portion of the foot, in a manner similar to the manner in which a pendant type pedal apparatus of the related art is operated, while the brake pedal 30 is operated by the entire portions of the foot, in a manner similar to the manner in which a pedal device in the shape of an organ pedal is operated. Accordingly, the pedal apparatus according to an exemplary embodiment of in various aspects of the present invention, the operation of the accelerator pedal 20 and the operation of the brake pedal 30 may be clearly distinguished from each other, advantageously preventing an erroneous operation from being performed by the driver.

Furthermore, the pedal apparatus according to an exemplary embodiment of the present invention may be implemented as an electronic pedal device, which may be advantageously used in vehicles provided with an electronic brake system or vehicles provided with an in-wheel propulsion system.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedal apparatus for a vehicle, the pedal apparatus comprising:
    a pedal housing configured to be fixedly mounted in a space in which a driver's foot is located;
    an accelerator pedal and a brake pedal pivotably connected to the pedal housing;
    a guide groove arranged in a side surface of the pedal housing to extend along a radius of a rotation of the brake pedal;
    a flange protruding from the brake pedal toward the guide groove; and
    a stopper pin having a first end portion coupled to the flange and a second end portion inserted into the guide groove,
    wherein, when the accelerator pedal is operated, the accelerator pedal pivots with respect to the pedal housing independently of the brake pedal,
    wherein, when the brake pedal is operated, the brake pedal and the accelerator pedal pivot with respect to the pedal housing, and
    wherein the stopper pin moves along the guide groove to guide pivoting of the brake pedal and to prevent the brake pedal from being separated from the pedal housing when the brake pedal is operated.

2. The pedal apparatus of claim 1, wherein a portion of a top surface in the accelerator pedal and a portion of a bottom surface in the brake pedal overlap each other.

3. The pedal apparatus of claim 1, further including:
    a pedal hinge detachably connected to the pedal housing, wherein the pedal hinge includes:
        a first hinge protrusion to which the accelerator pedal is coupled; and
        a second hinge protrusion to which the brake pedal is coupled, and
    wherein the first hinge protrusion and the second hinge protrusion are separated from each other to be pivotable independently of each other with respect to the pedal housing.

4. The pedal apparatus of claim 3,
    wherein the accelerator pedal includes:
        a first hinge coupling portion coupled to the first hinge protrusion;
        an overlapping portion vertically extending from the first hinge coupling portion to overlap a portion of a bottom surface in the brake pedal; and
        a first control portion laterally extending from a distal portion of the overlapping portion to protrude beyond an edge portion of the brake pedal, and
    whereby the first control portion is operated by a front portion of the driver's foot that adjoins the first control portion.

5. The pedal apparatus of claim 4, wherein the accelerator pedal further includes:
    a connecting portion laterally protruding from the overlapping portion in a direction opposite to the first control portion to be overlapped with the brake pedal.

6. The pedal apparatus of claim 4,
    wherein the brake pedal includes:
        a second hinge coupling portion coupled to the second hinge protrusion; and
        a second control portion vertically extending from the second hinge coupling portion to overlap a portion of an upper surface in the overlapping portion of the accelerator pedal,
    whereby the second control portion is configured to be operated by an entire portion of the driver's foot that adjoins the second control portion.

7. The pedal apparatus of claim 6, further including:
    a side cover bent from an edge portion of the second control portion toward the pedal housing.

8. The pedal apparatus of claim 7, further including:
    a permanent magnet coupled to the side cover of the brake pedal; and
    a printed circuit board coupled to the pedal housing, the printed circuit board being configured to detect a pivot angle of the brake pedal on a basis of displacements of the permanent magnets and transfer a signal to the controller when the brake pedal is manipulated.

9. The pedal apparatus of claim 1, further including:
    a pedal arm mounted in the pedal housing to be pivotable about a hinge shaft of the pedal housing;
    a first elastic member having first and second end portions supported on the pedal housing and the pedal arm, respectively;
    a push rod connecting the pedal arm and the accelerator pedal; and
    an accelerator position sensor coupled to the pedal housing to detect a pivot angle of the pedal arm and transfer a signal to a controller.

10. The pedal apparatus of claim 1, further including:
a second elastic member having first and second end portions supported on the pedal housing and the brake pedal to provide an elastic force by which the brake pedal resumes an original position of the brake pedal.

11. The pedal apparatus of claim 1, further including:
a permanent magnet coupled to a side cover of the brake pedal; and
a printed circuit board coupled to the pedal housing, the printed circuit board being configured to detect a pivot angle of the brake pedal on a basis of displacements of the permanent magnets and transfer a signal to a controller when the brake pedal is manipulated.

12. The pedal apparatus of claim 11,
wherein, when only the accelerator pedal is operated, an acceleration signal is generated by the accelerator position sensor, and
wherein when the brake pedal is operated, both an acceleration signal by the accelerator position sensor and a braking signal by the printed circuit board are generated.

13. The pedal apparatus of claim 12,
wherein, when only the acceleration signal is generated by the accelerator position sensor, the controller is configured to perform a control process to accelerate the vehicle,
wherein, when the acceleration signal by the accelerator position sensor and the braking signal by the printed circuit board are generated, the controller is configured to perform a control process to brake the vehicle by accepting the braking signal with priority higher than when only the acceleration signal is generated by the accelerator position sensor, and
wherein, when only the braking signal is generated by the printed circuit board, the controller is configured to perform a failure mode control process.

14. The pedal apparatus of claim 13,
wherein, when the vehicle provided with an electronic brake system and only the acceleration signal is generated by the accelerator position sensor in a response to the accelerator pedal being operated, the controller is configured to control an engine to accelerate the vehicle, and
wherein, when the vehicle provided with the electronic brake system and the acceleration signal by the accelerator position sensor and the braking signal by the printed circuit board are generated in a response to the brake pedal being operated, the controller is configured to perform a control process to brake the vehicle by controlling operations of a front wheel power transmission caliper and a rear wheel power transmission caliper.

15. The pedal apparatus of claim 13,
wherein, when the vehicle is provided with an in-wheel propulsion system and only the acceleration signal is generated by the accelerator position sensor in a response to the accelerator pedal being operated, the controller is configured to perform a control process to accelerate the vehicle by controlling operations of a front in-wheel motor and a rear in-wheel motor, and
wherein, when the vehicle is provided with the in-wheel propulsion system and the acceleration signal by the accelerator position sensor and the braking signal by the printed circuit board are generated in a response to the brake pedal being operated, the controller is configured to perform a control process to brake the vehicle by controlling operations of the front in-wheel motor and the rear in-wheel motor.

* * * * *